United States Patent
Nytomt et al.

(10) Patent No.: US 6,827,061 B2
(45) Date of Patent: Dec. 7, 2004

(54) METHOD IN CONNECTION WITH ENGINE CONTROL

(75) Inventors: Jan Nytomt, Åmål (SE); Urban Forsell, Linköping (SE)

(73) Assignee: Mecel Aktiebolag, Amal (SE)

( * ) Notice: Subject to any disclaimer, the term of this patent is extended or adjusted under 35 U.S.C. 154(b) by 70 days.

(21) Appl. No.: 10/276,417

(22) PCT Filed: May 14, 2001

(86) PCT No.: PCT/SE01/01039
§ 371 (c)(1),
(2), (4) Date: Nov. 15, 2002

(87) PCT Pub. No.: WO01/88359
PCT Pub. Date: Nov. 22, 2001

(65) Prior Publication Data
US 2003/0172907 A1 Sep. 18, 2003

(51) Int. Cl.$^7$ .............................. F02P 5/152; F02P 5/153
(52) U.S. Cl. ............................ 123/406.27; 123/406.29; 123/406.41; 123/435
(58) Field of Search ....................... 123/406.27, 406.29, 123/406.41, 435

(56) References Cited

U.S. PATENT DOCUMENTS

| | | | |
|---|---|---|---|
| 4,932,379 A | 6/1990 | Tang et al. | 123/436 |
| 5,076,098 A * | 12/1991 | Miwa | 73/115 |
| 5,093,792 A * | 3/1992 | Taki et al. | 701/111 |
| 5,678,520 A | 10/1997 | Hori et al. | 123/419 |
| 5,778,855 A * | 7/1998 | Czekala et al. | 123/406.27 |
| 5,983,155 A | 11/1999 | Bederna et al. | 701/104 |
| 6,091,244 A * | 7/2000 | Rottler | 123/406.27 |
| 6,272,426 B1 * | 8/2001 | Tascillo | 123/435 |
| 6,336,440 B1 * | 1/2002 | Schmitz et al. | 123/406.27 |

OTHER PUBLICATIONS

JP 11093650 A (Nissan Motor Co. Ltd) Apr. 6, 1999 (ABSTRACT) World Patents Index [online]. London U.K.: Derwent Publications, Ltd. [retrieved on JUl. 16, 2001]. Retrieved from: EPO WPI Database. DW199924. Accession No. 1999–284589.

JP 11093650 (Nissan Motor Co Ltd.) Jul. 30, 1999 (Abstract). [online] [retrieved on Jul. 16, 2001] Retrieved from EPO PAJ Database, Copy of International Search Report.

* cited by examiner

Primary Examiner—Erick Solis
(74) Attorney, Agent, or Firm—Michael D. Bednarek; Shaw Pittman LLP

(57) ABSTRACT

This invention relates to a method in connection with engine control, wherein a combustion feedback signal is derived by measuring one or more combustion related parameters during a chosen time period of a first combustion cycle, for control of a possible fault, wherein at least one reference feature for said parameters has been determined previously, and comparing said measured combustion feed back signal with said reference feature for automatic adaptation of at least one combustion related variable during a forthcoming combustion cycle wherein at least one reference features for each one of at least two different fault situations having been determined previously, and that a diagnosis 3 of said first combustion cycle is performed on the basis of said combustion feedback signal being processed and compared ($T_1$–$T_n$) with each one of said reference features, the result of which is analysed by a decision logic, whereafter a diagnosis (D) is established by means of which one or more variables in a forthcoming combustion cycle is/are regulated in dependence of the outcome (D) of said diagnosis, thereby achieving fault tolerant engine control.

17 Claims, 3 Drawing Sheets

METHOD IN CONNECTION WITH ENGINE CONTROL

TECHNICAL FIELD

Figure 1:
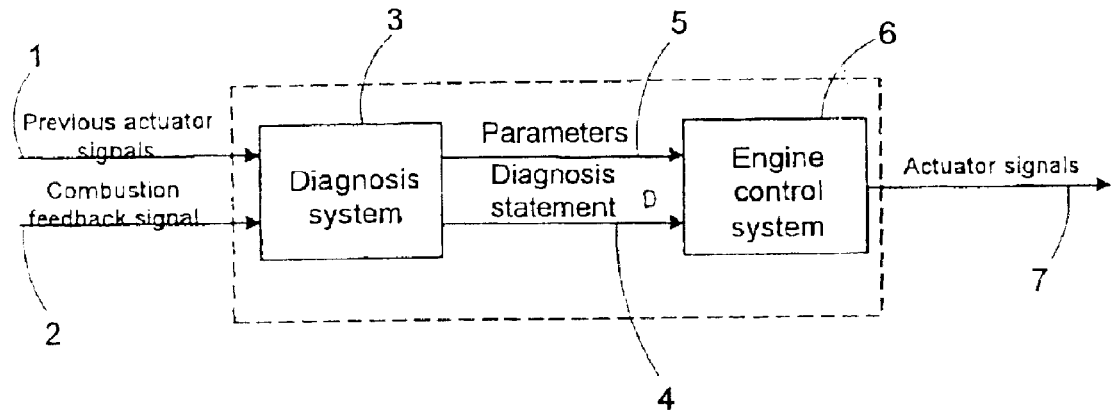

The present invention relates to a novel method in connection with a fault tolerant engine control system, wherein a combustion feedback signal is derived by measuring, in a combustion chamber, one or more combustion related parameters during a chosen time period of a first combustion cycle. For the corresponding time period, an ideal reference signal for said parameters has been previously determined. The method is primarily intended for control of Otto engines or Diesel engines.

BACKGROUND OF THE INVENTION

In engine control, it is a challenge to keep engine efficiency and combustion stability as high as possible while minimising emissions.

Control of Otto engines basically amounts to controlling three primary variables: ignition timing and fuel and air injected into the cylinder. For the two latter both the mass and the timing are important and these are controlled separately using different actuators such as the throttle, the fuel injectors, and the intake valves depending on engine design and mode of operation. For Diesel engines the main control variables are timing and mass of injected fuel. The main actuators for diesel engine control are, consequently, the fuel injectors. In today's engine control systems, most of the control functionality is implemented in form of look-up tables, which give the optimal ignition timing, say, for a certain operating point of the engine and at certain prevailing ambient condition. These systems require extensive calibration tests to meet the performance requirements under all driving conditions, including varying speed and load, fuel quality, air temperature, air pressure, air humidity, etc. Calibration of an engine management system is therefore typically a very time consuming and expensive task and accordingly there is a need for other control possibilities, especially since the requirements are continuously augmented.

It has been suggested to use continuous measurements of combustion conditions (combustion feedback signal) in order to eliminate the need of extensive calibration. However, known systems which use continuous measurements for engine control all show some drawbacks, as will be explained later. Ionisation current measurements and in-cylinder pressure measurements are two possible ways of obtaining desired information (combustion feedback signal) for engine control, as is known from e.g. SE-504197. The combustion feedback signal can be measured either directly in the combustion chamber, (as is known per se from e.g. R. Müller, M. Hart, A. Truscott, A. Noble, G. Krötz, M Eickhoff, C. Cavalloni, and M. Gnielka, "Combustion Pressure Based Engine Management System", SAE paper no. 2000-01-0928, 2000; J. Auzins, H. Johansson, and J Nytomt, "Ion-gap sense in misfire detection, knock and engine control", SAE paper no. 950004, 1995) or indirectly using non-intrusive sensors (as is known per se from, e.g. M. Schmidt, F. Kimmich, H. Straky, and R. Isermann, "Combustion Supervision by Evaluating the Crankshaft Speed and Acceleration", SAE paper no. 2000-01-0558, 2000; M. Sellnau, F. Matekunas, P. Battiston, C.-F. Chang, and D. Lancaster, "Cylinder-Pressure-Based Engine Control Using Pressure-Ratio-Management and Low-Cost Non-Intrusive Cylinder Pressure Sensors", SAE paper no. 2000-01-0932, 2000). As described in said publications (and publications defined below) these measurements are used for closed-loop engine control and that primary benefits of such closed-loop engine control are lower fuel consumption and emissions. Secondary benefits are various possible improvements in terms of improved misfire and knock detection, individual cylinder air/fuel ratio control, camshaft phasing, control of start-of-combustion, EGR rate control, etc. See e.g. Muller et al. (2000); Sellnau et al. (2000) according to the above, or H. Wilstermann, A. Greiner, P Hohner, R. Kemmler, R. Maly, and J. Schenk, "Ignition System Integrated AC Ion Current Sensing for Robust and Reliable Online Engine Control", SAE paper no. 2000-01-0553, 2000; or L. Nielsen and L. Eriksson, "An Ion-Sense Engine Fine-Tuner", IEEE Control Systems, 1998.

However, these known engine control systems all have in common that they are not fault tolerant, i.e. it may control/change the wrong variable since the interrelation between the different variables may be very complex and therefore extremely difficult to handle in both open-loop and closed-loop control systems. If for instance the fuel/air mixture is not optimised this may lead to a changed burn rate which in turn leads to a change in the peak pressure position that is used for closed-loop ignition timing control (e.g. SE 504 197). This leads to a suboptimisation of the engine control, which results in decreased efficiency of the engine and higher emission levels. There is also a risk that a multiple loop control system may cause drastic interference problems. Moreover they require time consuming tuning. The invention alleviates all these problems.

SHORT DESCRIPTION OF THE INVENTION

It is an object of the present invention to present a fault tolerant engine control system by utilising combustion feedback information, which is achieved by a method according to the invention, as presented in claim 1.

The proposed system leads to improved performance and increased functionality compared to existing solutions for engine control, and is conceptually simpler and therefore also more cost efficient.

According to a further aspect of the invention model-based diagnosis is used. By using model-based diagnosis, preferably parametric, a unique highly efficient diagnosis system can be designed and quantitative information about the size of the fault be obtained, which enables efficient adaptation of the control law, for optimisation of the performance of an engine.

Parametric modelling of the ionisation current signal is indeed known per see from, e.g. SE 504 197, which suggests determining the time location of the pressure peak during a combustion cycle, by detecting the ionisation degree in the combustion chamber and fitting a parametric model to the measured ionisation current. A peak point in the model curve is used in order to determine the time location of the pressure peak during the combustion cycle. According to a preferred embodiment, the measured ionisation current is parameterised by being fitted to two consecutive and partially overlapping Gaussian functions. It is also suggested to control the ignition timing of the combustion cycle by controlling the pressure peak to lie within a predetermined time interval, the location of which depends at least on the prevailing load and motor speed. In H. Klövmark. "Estimating Air/Fuel Ratio from Gaussian Parameterisations of the Ionisation Currents in Internal Combustion SI Engines", Master thesis EX 065/1998, Chalmers University of Technology, 1998, it has also been suggested to parameterise the measured ionisation current in order to estimate air/fuel ratio.

However, none of the latter described systems are able of performing fault tolerant engine control and they also only feature single-variable optimisation, not multivariable optimisation.

The proposed engine control system combines three different techniques in a unique manner resulting in a fault tolerant engine control system, which may provide an enormous progress in controlling engine efficiency, high combustion stability and minimised emissions.

According to another aspect of the invention, the type of faults that are detected and which the control system is adapted to handle is one or more of the fault situations in the group that comprises misfire, pre-ignition, knock intensity, wrong location of peak pressure, wrong air-fuel ratio and wrong EGR rate.

DETAILED DESCRIPTION OF THE INVENTION

Figure 2:
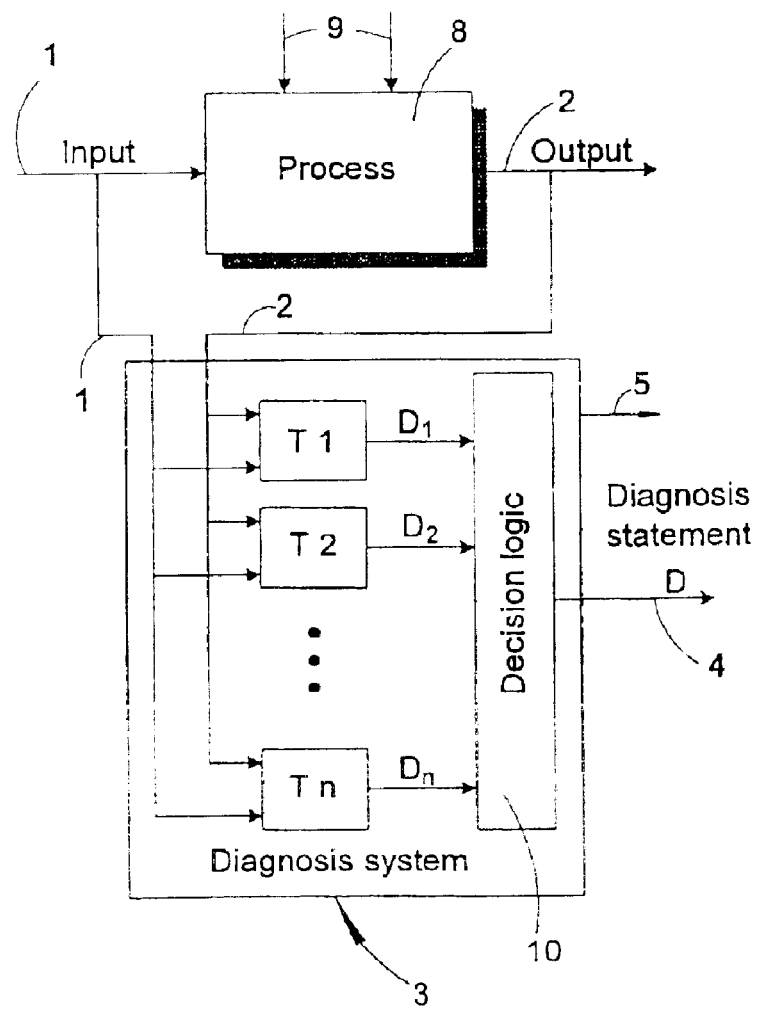
Figure 3:
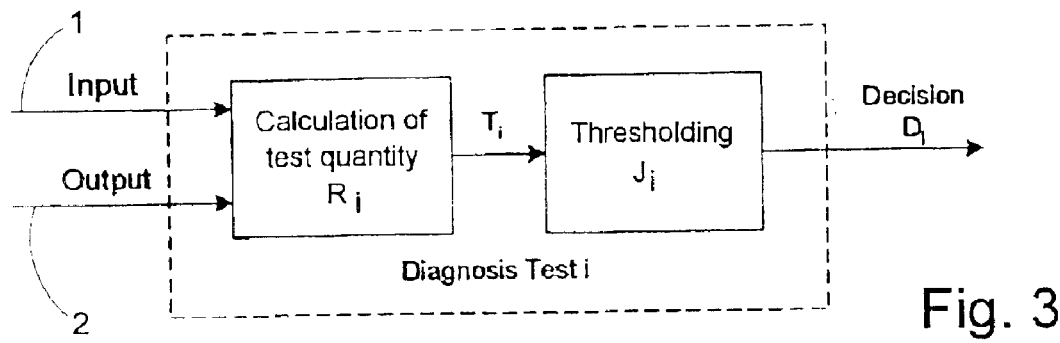
Figure 4:
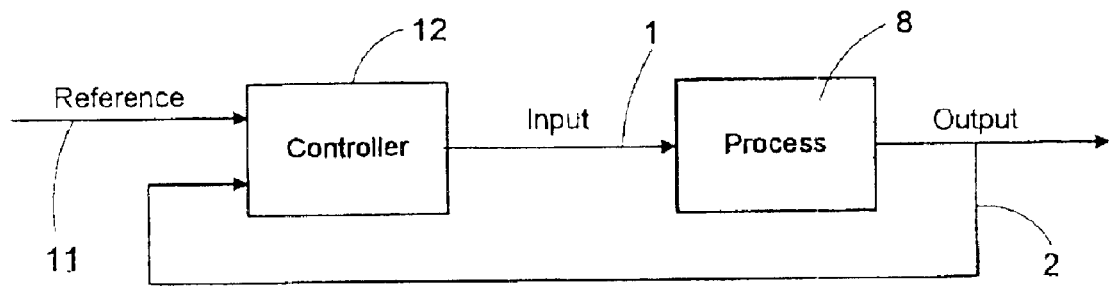
Figures 5A, 5B:
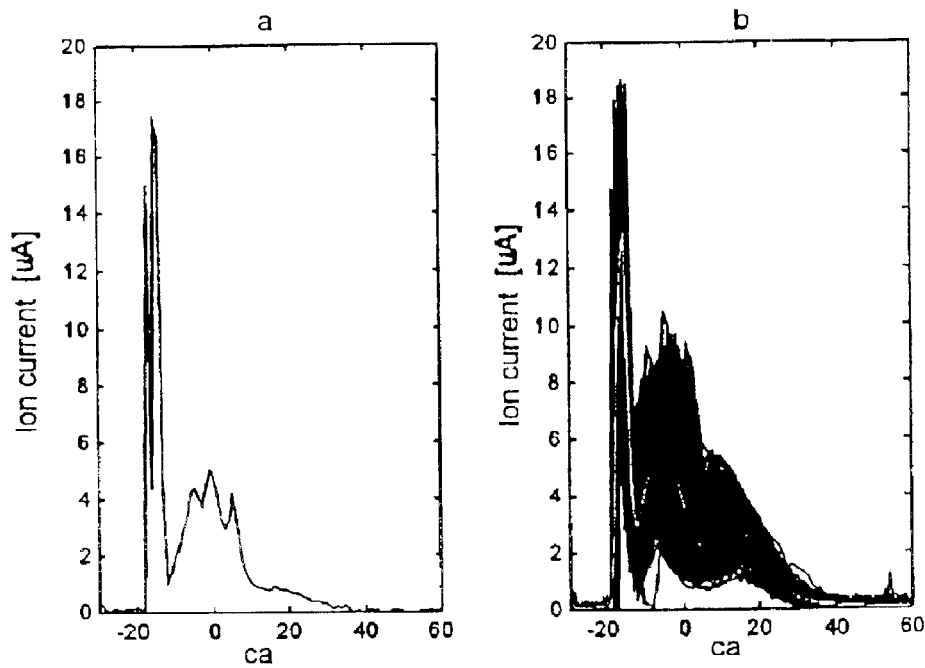
Figure 6A:
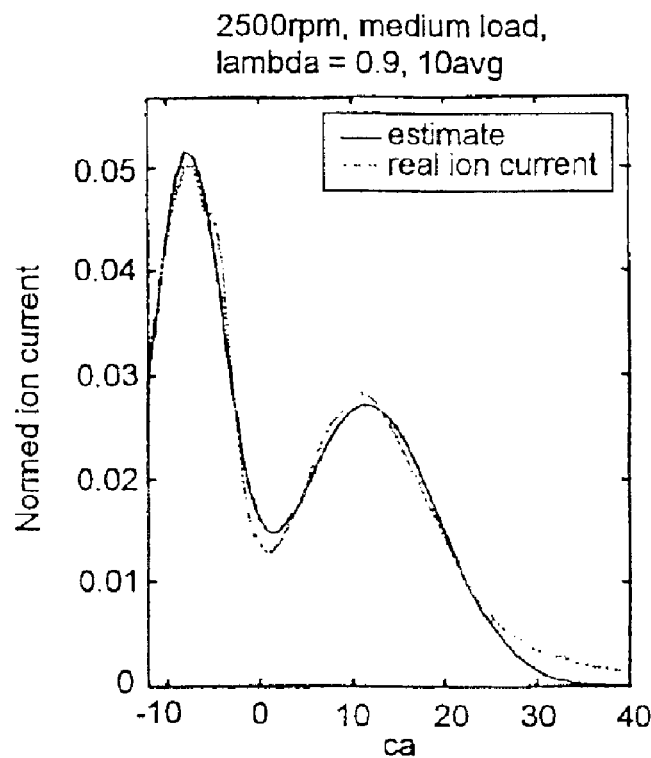
Figure 6B:
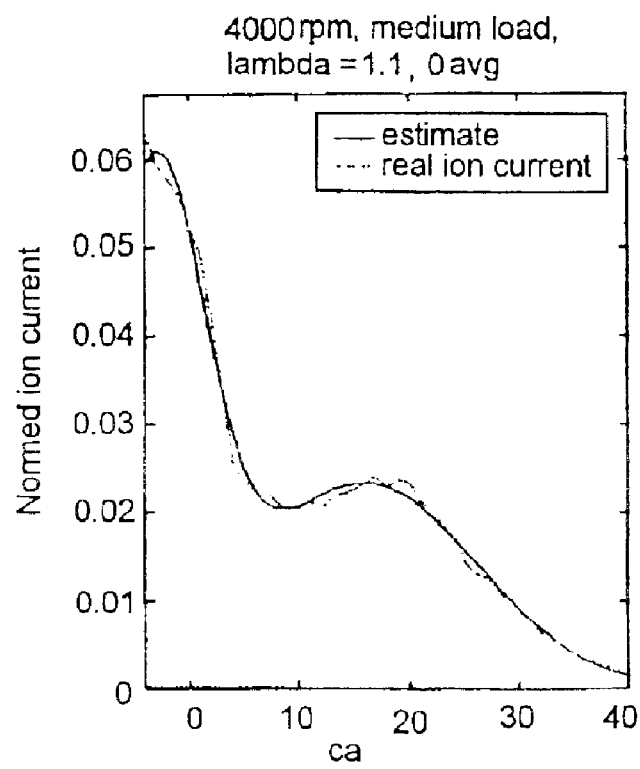

In the following, the present invention will be described in more detail, while referring to the drawing figures, of which:

FIG. 1 is showing an overall structure of a fault tolerant engine control system according to the invention, FIG. 2 is describing the diagnosis system used in FIG. 1, FIG. 3 is describing a conceivable method for the diagnosis tests used in FIG. 2, FIG. 4 is describing a feedback control system, which may be used for the engine control according to the invention, FIGS. 5a-b is showing two examples of ionisation current cycle-to-cycle variations and average behaviour, FIGS. 6a-b is showing two examples of fitting results that may be obtained when parameterising the measured signals, Fault tolerant control aims at designing control systems that can continue to operate despite faults or other disturbances that may affect the process. To achieve fault tolerance one must combine fault diagnosis and control. The basic idea in most fault tolerant control systems is to continuously monitor the status of the system and to make suitable changes in the control strategy to adapt to the new situation, if a fault has occurred.

The overall idea of the invention is to estimate a, preferably parameterised, model of a combustion feedback signal (e.g. a cylinder pressure signal or an ionisation current signal) and to compare this model with some reference value(s) for a number of different variables, in order to qualitatively and quantitatively determine a fault situation. Based on this information, the engine control is adapted to improve efficiency and combustion stability and to reduce emissions in the next combustion cycles.

The overall structure of the proposed system is depicted in FIG. 1. The inputs to the system are the previous actuator signals 1 (if necessary) and the combustion feedback signal 2, e.g. a cylinder pressure curve or an ionisation current curve. These signals are fed into a diagnosis system 3, which performs a classification of the combustion into one of the considered classes: normal combustion, misfire, etc. The classification is preferably based on an estimation of a parametric model of the combustion feedback signal and can be done directly using the estimated parameter values (e.g. Nielsen and Eriksson (1998) according to the above), or indirectly through some additional processing of these values (which, in addition, may require the availability of the previous actuator signals; e.g. H. Klövmark (1998) according to the above). The output from the diagnosis system is the result 4 of this classification plus the estimated parameter values 5. Supplied with this information, the engine control unit 6 calculates the optimal actuator signals 7 for control of the next combustion cycle. A preferred implementation involves using the diagnosis result 7 in a mode-switching scheme for the engine controller, so that the best strategy (among a number of pre-designed ones) is chosen to improve the control. This may be achieved by providing the control unit 6 with a memory unit comprising a number of pre-programmed control strategies/corrections among which a processing unit of the control unit can chose depending on the diagnosis result D. The parameters 5 are used to determine the size of the corrections of the actuator signals from their last values.

In the preferred embodiment, the combustion is classified by means of parametric modelling of the combustion feedback signal, and this information is thereafter used for the diagnosis, i.e. to adapt the control action.

For the description of the diagnosis system 3, FIG. 2, there is adopted a quite general form proposed in M. Nyberg, "Model Based Fault Diagnosis: Methods, Theory, and Automotive Engine Applications". PhD thesis, Linköping University, 1999, see FIG. 2. As shown in the figure, the process 8 (the combustion) is subject to faults and disturbances 9 and it is the diagnosis system's task to diagnose the system's status (type of fault/s) based on observations of the process inputs 1 (=the previous actuator signals) and outputs 2 (=the combustion feedback signal). The primary output of the diagnosis system is the diagnosis statement D. As a secondary output we will use estimated parameter values, which can be obtained from the diagnosis system 3.

To facilitate fault isolation, one has to distinguish between several possible fault modes. Typically this is done by using a bank of diagnosis tests $T_1-T_n$ combined with a decision logic 10 that determines which type of fault has occurred, see FIG. 2. The individual tests $T_1-T_n$ are often implemented using thresholding, which can be interpreted as hypothesis testing (Nyberg (1999) according to the above), as will be described in more detail below in connection with FIG. 3.

In the application of the present invention we are interested in detecting/estimating faults/abnormalities such as Misfire (T1)

Pre-ignition (T2)

Knock intensity (T3)

Location of peak pressure (T4)

Air-fuel ratio (T5)

EGR rate (T6)

using the combustion feedback signal. In principle, we need to device different diagnosis tests for each fault mode considered to facilitate fault isolation. Confer FIG. 2. In some cases, though, the number of tests can be reduced by use of a clever decision logic in the diagnosis system.

FIG. 3 describes how a test $T_i$ is typically implemented. For the computation of the test quantities $R_i$ there is preferably used a unified approach for all tests based on fitting a parametric model to the measured combustion feedback signal 1. To classify the combustion, the estimated parameter values (the estimated curve shape) are thereafter compared to different reference/"nominal" ones, e.g. one set extreme parameters per considered fault/abnormality mode; according to another aspect of the invention, one or more extreme signals and/or one or more ideal reference signals which is/are used for the diagnosis is/are chosen in dependence of the current operating conditions of the engine. Thus, the ideal and extreme signals chosen for the diagnosis comparison may vary depending on factors such as the currently prevailing temperature, the load and the engine speed. Also, the extreme signals may affect each other, whereby e.g. when a knocking situation has been determined; the entire signal is enhanced in amplitude, in its turn leading to other extreme signals being altered.

The comparison can for example be made on the basis on the Euclidean distances between the current parameter vector and the nominal ones, or on the basis of single-parameter comparisons. This corresponds to "Calculation of test quantity" $R_i$ in FIG. 3. The next step is the thresholding $J_i$ followed by the final decision $D_i$, which is implemented by the decision logic, cf. FIG. 2

From a pure controls perspective, the system in FIG. 1 can be redrawn as a standard feedback control system, as shown in FIG. 4. The idea is to compare the measured output 2 with some reference values 11 and to update the input 1 based on the difference between these two. The controller 12 can be static, but most often it is dynamic (i.e. some form of memory); a standard example is PI-control (Proportional and Integrating control).

If we translate this to the engine application, the feedback 2 is obtained through the measurement of the combustion related parameter. This signal is fed into the diagnosis system 3, which performs an analysis of the signal and compares the shape of the signal with some ideal or reference shape (or rather shapes, since the diagnosis system contains a number of such tests in parallel). This comparison results in a classification D of the latest combustion into one of the considered types (normal, misfire, knocking, etc) and in an estimate of the severity of the fault (abnormality). The classification can be used in a mode-switching strategy for the engine controller, so that the correct strategy is chosen to improve the control. The estimated severity of the fault is used to determine the size of the correction to the input signal. This can, for example, be implemented using a PI-controller.

EXAMPLE

To further explain the concept behind the classification and the parameter estimation according to the invention, there is now presented an example where the ionisation current signal is used as combustion feedback signal. The ionisation current (and also the cylinder pressure) is directly coupled to the combustion and contains all necessary information on the combustion quality. Hence it is well suited for engine control purposes.

Modelling of Ionisation Current Signals

FIG. 5a-b shows two examples of ionisation current cycle-to-cycle variations and average behaviour. FIG. 5a shows a single ionisation current curve and FIG. 5b shows a number of consecutive cycles and—inverted—the average of these curves.

Several studies, e.g. Nielsen and Eriksson (1998) according to the above, have shown that the ionisation currents can be effectively modelled using a parametric radial basis function network. In this example there is considered models of the form:

$$P(\theta) = g_1(\theta) + g_2(\theta) g_1(\theta) = \alpha_1 \cdot e^{-\alpha_2(9-\alpha_3)^2}, g_2(\theta) = \alpha_4 \cdot e^{-\alpha_3(9-\alpha_4)^2}$$

This gives a model with a total of six parameters, which can be fitted to the measurement data using some numerical estimation routine. A standard approach would be to consider a least-squares criterion and to use a Gauss-Newton type of search algorithm. Two examples of the type of fitting results that are possible to obtain, with the use of least-squares fit, are shown in FIG. 6a-b. (The plot shows a particular window in the crank angle domain). Note that the parameter $\alpha_1$, for example, defines the height of the first basis function $g_1$ and $\alpha_2$ and $\alpha_3$ the width and position of it, respectively, in the crank angle domain. Analogous interpretations of the remaining three parameters apply for the second basis function $g_2$.

In Nielsen and Eriksson (1998) according to the above it is shown that this type of modelling of the ionisation current can be performed in real time for cycle-to-cycle closed-loop control of the ignition timing. Building on this, the Klövmark (1998) thesis according to the above studied various possibilities for estimating the air-fuel ratio using basically the approach suggested here: parametric modelling of the ionisation current (the combustion feedback signal) followed by air-fuel ratio estimation using the estimated parameter values. Supported by these (and other) studies, the present invention extends this idea to involve more engine control functions such as misfire detection and prevention, knock control, individual cylinder air-fuel ratio control, and EGR rate control and to establish a diagnosis based on the combined result of possible different identified faults/ disturbances. According to a preferred embodiment of the invention these functionalities are implemented in the unified way described above, using the same parametric model for different tests, which leads to saved computations and promises to give improved performance compared to existing techniques.

In order to give two examples of the modelling of the combustion feedback signal, misfire detection and knock estimation will be briefly discussed in the following.

Misfire Detection

The problem is to detect if a misfire has occurred. A misfire is recognised by no or very little combustion intensity. Since the ionisation current directly reflects the combustion intensity it is clear that the ionisation current signal will vanish or be very small for a misfire. Consequently, for a misfire the height and width parameters $\alpha_1$, $\alpha_2$, $\alpha_4$ and $\alpha_5$ will be zero (small), which corresponds to the nominal parameter values in the misfire case. Thus, if it is detected, after the parameter estimation, that the height and width parameters of the resulting model are below some suitably chosen reference value threshold, the latest combustion cycle can be recognised to be a misfire.

Another possibility is to measure combustion intensity by calculating the area under the functions over a window in the crank angle domain. As this integral can be calculated analytically and stored as a function, which is called when the estimated parameter values has been established, it is possible to detect misfire when this integral/function value is below the reference value threshold.

The outlined ideas are just two possibilities for implementing misfire detection using the proposed approach. Several other variations of this theme are of course also possible.

Knock Estimation

The pressure variations present in the cylinder during engine knocking can severely damage the engine; hence it is very important to have efficient knock detection and control algorithms. The frequency of the knock is fixed (roughly) and engine dependent and knock always occur after the piston has reached top dead centre (TDC). These facts allows for efficient knock estimation through suitable windowing (in the crank angle domain) and band-pass filtering of the cylinder pressure or the ionisation current.

In the framework as presented, the parameterised model will typically not be able to pick up the (high) frequency components in the combustion feedback signal due to knock, and hence the resulting model will present a "knock-free" counterpart of the measured signal. If the difference between the measured signal and the (knock-free) model is established and the energy (or some other norm/measure) of this signal is computed over a suitably chosen window, it is possible to estimate the knock intensity. A benefit of this approach to knock estimation is that the parametric model, which is estimated anyway for other purposes, can be re-used also for this purpose. Further, the suggested implementation idea also avoids band-pass filtering of the combustion feedback signal, which saves computation.

The fault-tolerant engine control system according to the invention can be expected to give a level of performance and robustness that is impossible to achieve with standard approaches, which typically utilise look-up tables and open-loop control. Thanks to the modular design of the system and re-use of the estimated model in several parts (tests) the computational load can also be kept reasonably small. This advantage is expected to become more and more important as the performance requirements on the engine control systems become higher. A related issue is that of calibration or tuning, which today is a very time consuming and costly part of engine development. The solution according to the invention can alleviate these problems while giving higher performance. It can also be noted that the system also replaces the special diagnosis functions that are used today to detect misfire and knock and promises to improve diagnosis performance as well, compared to the standard algorithms. This further adds to the advantages that are obtained with the proposed system.

Air/fuel Ratio and Ignition Timing Control

As mentioned above, one of the main features of the invention is the idea to use multivariable optimisation. Consider as an example the case of air/fuel ratio control and ignition timing control. For optimal catalyst performance it is important to control the air/fuel ratio tightly around the stochiometric value. For a certain ignition timing this leads under normal conditions to a particular combustion development and hence a particular ionisation curve shape. Assuming control of the air/fuel ratio (a/f) within a range (e.g. 0,8<a/f<1,2) near and slightly below the stochiometric value (a/f=1), a more lean mixture (a/f is in the upper part of the range) leads to a slower burn rate and consequently a later peak pressure position. The opposite is true for a rich mixture, i.e. a/f is in lower part of the range.

In SE 504 197 a method for closed-loop ignition timing control is described. The idea is to locate the peak pressure position (PPP) and to adjust the ignition timing to keep the PPP in a narrow window for optimal efficiency of the engine.

It is not hard to realise that this ignition timing control strategy may fail and lead to suboptimisation if the reason why the PPP is moved is not a change in the ignition timing but rather a change in the air/fuel ratio, as exemplified above.

According to another known prior art, example, the air/fuel ratio is, during steady state conditions, normally controlled in a closed loop through feed-back from an oxygen sensor in the exhaust. During transients or during the warm up phase the air/fuel ratio is normally controlled in an open loop using look up tables. In an engine control system the actual air/fuel ratio can deviate from the desired because of various kinds of disturbances. One example of disturbances is changes in the air distribution in the intake manifold. This will result in a wider distribution in air/fuel ratio over cylinders even if the air/fuel ratio for the sum of the cylinders still corresponds to the desired value. This kind of disturbances is hard to compensate for using a normal closed loop lambda control system, as normally one oxygen sensor is used for a number of cylinders. An other example of disturbances, that will affect the air/fuel ratio, is the changes in air humidity. Increased humidity will for a given fuel quantity result in a leaner mixture. There is today no technique developed that in an efficient way compensates for disturbances such as the examples described above.

The solution to the above mentioned problems is to use multivariable diagnosis and optimisation as is suggested in the invention, which will give improved control performance. If efficiently implemented this will also save development time and tuning costs.

Example of Changes in Air Humidity

If a vehicle equipped with the proposed diagnosis systems enters a foggy area and the air humidity increases, the system will handle the disturbance in the following manner. The example refers to FIG. 1 and FIG. 2 with bank of diagnosis tests T1 to T6, Decision logic 10, Diagnosis statement 4 and Engine Control System 6.

Status Before Entering the Foggy Area:

| Test | Fault/Abnormalities | Diag | Status |
| --- | --- | --- | --- |
| T1 | Misfire | D1 | No misfire |
| T2 | Pre-Ignition | D2 | No pre-ignition |
| T3 | Knock Intensity | D3 | No knock |
| T4 | Location of Peak Pressure | D4 | OK |
| T5 | Air-Fuel Ratio | D5 | OK |
| T6 | EGR Rate | D6 | OK |

As no fault condition is detected the Decision logic 10 generates a Diagnosis statement 4 to the Engine Control System 6, that the conditions are ok.

Status After Entering the Foggy Area

| Test | Fault/Abormalities | Diag | Status |
| --- | --- | --- | --- |
| T1 | Misfire | D1 | No misfire |
| T2 | Pre-Ignition | D2 | No pre-ignition |
| T3 | Knock Intensity | D3 | No knock |
| T4 | Location of Peak Pressure | D4 | Very late peak pressure position |
| T5 | Air-Fuel Ratio | D5 | Lean mixture |
| T6 | EGR Rate | D6 | OK | n

As we can see, the increased humidity reslulted in leaner mixture and a delayed peak pressure location. The diagnosis outputs D1 to D6 are analysed in the Decision logic 10 and a Diagnosis statement 4 will be generated as an input for control in the Engine Control System 6. As a lean mixture also can be the reason for the late combustion the decision logic 10 will as a first action generate a Diagnosis statement 4 that indicates that the mixture is to lean. The Engine Control System 6 will increase the amaount of fuel in order to correct the fault. After correction of the air fuel ratio the status could bee as follows.

Status After Correction of Airf/fuel Ratio:

| Test | Fault/Abnormalities | Diag | Status |
|------|---------------------|------|--------|
| T1 | Misfire | D1 | No misfire |
| T2 | Pre-Ignition | D2 | No pre-ignition |
| T3 | Knock Intensity | D3 | No knock |
| T4 | Location of Peak Pressure | D4 | Late peak pressure position |
| T5 | Air-Fuel Ratio | D5 | OK |
| T6 | EGR Rate | D6 | OK |

As we can see the location of peak pressure is still to late. This means that the delayed peak pressure location was not only due to the leaner mixture. The Decision logic 10 will now generate the Diagnosis statement 4 for Correction of ignition timing only. After correction of ignition timing the status should be as the following.

Status After Correction of Air/fuel Ratio and then the Ignition Timing:

| Test | Fault/Abnormalities | Diag | Status |
|------|---------------------|------|--------|
| T1 | Misfire | D1 | No misfire |
| T2 | Pre-Ignition | D2 | No pre-ignition |
| T3 | Knock Intensity | D3 | No knock |
| T4 | Location of Peak Pressure | D4 | OK |
| T5 | Air-Fuel Ratio | D5 | OK |
| T6 | EGR Rate | D6 | OK |

The above example is a very simple example of how one disturbance can affect more than one combustion parameter. By analysing all diagnostics outputs the most correct action can be defined. In other cases there can be much more complex situations where several combustion parameters are affected and has to be taken into account.

The invention is not limited to the above-described embodiments, but may be varied within the scope of the claims.

What is claimed is:

1. Method in connection with engine control, wherein a combustion feedback signal (2) is derived by measuring in real time in a combustion chamber one or more combustion related parameters during a chosen time period of a first combustion cycle, for control of a possible fault, wherein at least one reference feature for said parameters has been determined previously, and comparing said measured combustion feed back signal with said reference feature for automatic adaptation of at least one combustion related variable during a forthcoming combustion cycle characterised in that at least one reference feature for each one of at least two different fault situations having been determined previously, and that a diagnosis (3) of said first combustion cycle is performed on the basis of said combustion feedback signal being processed and compared ($T_1$–$T_n$) with each one of said reference features, the result of which is analysed by a decision logic, where after a diagnosis (D) is established that decides which fault is to be prioritized by means of which one or more variables in a forthcoming combustion cycle is/are regulated in dependence of the outcome (D) of said diagnosis, thereby achieving fault tolerant engine control.

2. Method according to claim 1, characterised in that said combustion feedback signal (2) is modelled, resulting in one or more parameter values which are used to establish a diagnosis of said first combustion cycle.

3. Method according to claim 2, characterised in that said combustion feedback signal is modelled by a parameterised function, preferably by means of a radial basis function network.

4. Method according to claim 3, characterised in that at least one of said one or more parameters is used for said comparison, said reference feature having been paramaterised too.

5. Method according to claim 2, characterised in that said parameter values from said modelling also is used to establish the magnitude for the regulation of the variables that are to be regulated according to the diagnosis D.

6. Method according to claim 1, characterised in that at least three reference features of at least three different fault situations having been determined previously and being compared.

7. Method according to claim 1, characterized in that said reference feature comprises at least one ideal reference signal and at least one extreme reference signal.

8. Method according to claim 1, characterized in that said combustion feedback signal consists of an ion current signal, measured in the combustion chamber.

9. Method according to claim 1, characterized in that said combustion feedback signal consists of a cylinder pressure signal.

10. Method according to claim 1, characterized in that input actuator signals (1) for said first combustion cycle are used as additional information for said diagnosis.

11. Method according to claim 1, characterized in that said one or more extreme signals comprises one or more extreme signals in the group that consists of misfire, pre-ignition, knock intensity, wrong location of peak pressure, wrong air-fuel ratio and wrong EGR rate.

12. Method according to claim 1, characterized in that said ideal reference signal and/or said one or more extreme signals for said comparison is/are chosen in dependence of the current operating conditions of the engine.

13. Method according to claim 1, characterized in that the variable or variables which is/are controlled comprises one or more variables in the group that consists of ignition timing, mass of fuel and/or air injected or timing of fuel and/or air injected.

14. Method according to claim 1, characterized in that said diagnosis (3) comprises thresholding ($J_i$).

15. Method according to claim 1, characterized in that said one or more variables in said forthcoming combustion cycle is/are regulated by calculation of optimal actuator signals (7) for that combustion arid/or by choice from two or more pre-designed control strategies.

16. A computer programme product directly loadable into the internal memory of a digital computer, comprising software code portions for performing the method of claim 1, when said product is run in a computer.

17. A computer readable medium comprising software code portions for performing the method of claim 1 when said product is run in a computer.

* * * * *